US008918099B2

(12) United States Patent
Mitchell

(10) Patent No.: US 8,918,099 B2
(45) Date of Patent: Dec. 23, 2014

(54) AIR-TO-GROUND WIRELESS DECONFLICTION FROM GROUND-TO-GROUND CELLULAR COMMUNICATION

(75) Inventor: James P. Mitchell, Cedar Rapids, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 211 days.

(21) Appl. No.: 13/555,796

(22) Filed: Jul. 23, 2012

(65) Prior Publication Data

US 2014/0024365 A1    Jan. 23, 2014

(51) Int. Cl.
*H04W 4/00*      (2009.01)

(52) U.S. Cl.
USPC .......... 455/431; 455/28; 455/435.1; 455/436; 375/141; 375/146; 375/147; 370/319; 370/320; 370/342

(58) Field of Classification Search
CPC ...... H04B 1/7174; H04B 7/0697; H04B 7/12; H04J 13/0077; H04J 14/02; H04J 14/0298; H04L 1/04; H04L 27/2637; H04L 27/2697; H04L 5/0021; H04L 7/18506; H04W 16/14; H04W 84/06; H04W 8/005
USPC ............... 455/428, 431, 435.1; 375/141, 146, 375/147; 370/319–322, 342, 343, 347
See application file for complete search history.

(56) References Cited

U.S. PATENT DOCUMENTS

| | | | |
|---|---|---|---|
| 2008/0004016 A1* | 1/2008 | Smee et al. | 455/435.1 |
| 2009/0110033 A1 | 4/2009 | Shattil | |
| 2009/0318138 A1* | 12/2009 | Zeng et al. | 455/431 |
| 2010/0035607 A1* | 2/2010 | Horr et al. | 455/428 |
| 2010/0173637 A1* | 7/2010 | Damnjanovic et al. | 455/447 |
| 2011/0035463 A1* | 2/2011 | Dillon | 709/217 |
| 2011/0244855 A1* | 10/2011 | Parker | 455/426.1 |

* cited by examiner

*Primary Examiner* — Babar Sarwar
(74) *Attorney, Agent, or Firm* — Angel N. Gerdzhikov; Donna P. Suchy; Daniel M. Barbieri

(57) ABSTRACT

A method and system is disclosed enabling deconfliction between a ground-based radio and an airborne radio while both radios are in wireless data communication with a ground-based cellular network via the same ground-based connection node or tower. An orthogonal plurality of time/frequency segments is divided into a ground group of segments and an air group of segments by dynamically placing a frequency barrier between the two groups. Through dynamic allocation between groups and between the plurality of time/frequency segments within each group, interference free communication may coexist while both radios are wirelessly connected to the same tower. Additionally, an uplink (from airborne radio to tower) frequency may be moved to a second, distant frequency band to deconflict with the uplink and downlink first frequency band allotted to the ground-based radio while the downlink from tower to airborne radio remains within the first frequency band.

24 Claims, 6 Drawing Sheets

600

610
- communicating with a ground-based radio via
  - 612: sending a first wireless signal to the ground-based radio via a first frequency, the first frequency being within a first frequency band
  - 614: receiving a second wireless signal from the ground-based radio via a second frequency, the second frequency being within the first frequency band 620
- 622: deconflicting an airborne radio communication from the ground-based radio communication via a split band
- 624: configuring a proxy server at a ground-based connection node to facilitate communicating between the airborne radio and a ground-based cellular network
- 626: sending a third wireless signal to the airborne radio via a third frequency, the third frequency being within the first frequency band
- 628: configuring an airborne proxy server associated with the airborne radio to facilitate the communicating between the airborne radio and the ground-based connection node
- receiving a fourth wireless signal from the airborne radio via a fourth frequency, the fourth frequency being within a second frequency band

FIG. 6

AIR-TO-GROUND WIRELESS DECONFLICTION FROM GROUND-TO-GROUND CELLULAR COMMUNICATION

CROSS REFERENCE TO RELATED APPLICATIONS

The present application is related to, and incorporates herein by reference, U.S. patent application Ser. No. 13/539,638 filed 2 Jul. 2012, by James P. Mitchell, entitled "Terrestrial Communications Network Suitable for providing Air-to-Ground Connectivity." The present invention is also related to, and incorporates herein by reference, U.S. patent application Ser. No. 13/493,047 filed 11 Jun. 2012, by James P. Mitchell, entitled "Air-To-Ground Antenna Pointing Using Kalman Optimization of Beam Control Systems."

FIELD OF THE INVENTION

The present invention relates generally to communication deconfliction between an airborne user and a ground user of a ground based wireless network. More particularly, embodiments of the present invention relate to a computerized method and system for dynamic allocation of time slice bandwidth of a ground based cellular network signal for use by airborne connection nodes. Further embodiments of the present invention relate to a method for frequency deconfliction between an uplink from an airborne user and an uplink from ground user to the same connection node.

BACKGROUND OF THE INVENTION

Ground-based users of ground-based wireless networks may expect a near 100% level of interference free connectivity to the wireless network. While such interference free connectivity may have become the norm rather than the exception, tolerance for interference to this near 100% level of ground-based connectivity may have decreased to near zero among users and customers.

Potential airborne users connected to the ground-based wireless network may experience challenges to connectivity. Interference with a second airborne user connected to the ground-based wireless network may cause disrupted connectivity, incomplete connectivity, and possibly an inability to connect.

Ground-based cellular networks are nearly ubiquitous throughout many geographic areas. Build out of wireless networks continues and may be near 100% in many areas. Various worldwide network connectivity technologies may be available including code division multiple access (CDMA), global system for mobile (GSM), universal mobile telecommunications system (UMTS), and long term evolution (LTE). Such ground-based wireless networks may possess more time/spectrum availability than may presently be in use by ground-based users. Specifically, more recent advancements in network connectivity technology may enable current networks to increase time/spectrum availability throughput of each network.

Demand for airborne connectivity to a ground based network has increased. Increased use of network access by airborne users may increase productivity during previously unproductive airborne periods. Airborne users may account for an increasing number of access points to ground based networks.

An airborne user desiring connectivity to a ground-based network may have a limited number of options from which to choose to connect to the ground-based network. For example, satellite based wireless networks may be available to an airborne user to connect via a two-way signal transmitted from earth to satellite to aircraft. Similarly, two-way air-to-ground RF connectivity may be available allowing data connectivity between an airborne user and a ground network via an RF signal transmitted to dedicated RF networks.

On occasion, these airborne users may experience a lack of connectivity to satellite based signals and current ground based signals. This lack of connectivity may stem from a variety of sources, some of which may include a distance between a user and the receiving antenna, bandwidth limitations inherent in the existing connectivity scheme, and an incorrect antenna look angle. This lack of connectivity may decrease value of network connectivity methods as well as reduce connectivity options for airborne users.

During air-to-ground RF transmissions, an aircraft radio may be at an advantaged position as compared to a ground based radio. With equal power, a transmission pattern of the aircraft antenna may cover a larger geographical area than the transmission pattern of a provider's ground-based antenna. Potential interference may occur between airborne users and ground users connecting in the same RF frequency band with the same tower of the wireless network. While reuse of cellular ground towers is an attractive idea for air-to-ground concepts, it may be difficult to pin-point the beam of an airborne antenna to a small geographical location to transmit to a small set of towers for the uplink (i.e. the transmission from user to tower). Longer wavelengths in the 700 MHz cellular bands may prevent development of air antennas with a resolution of less than 18 degrees in azimuth. This small angle however may enable dozens of ground-based towers to be illuminated when the airborne antenna is pointed near the horizon.

Similarly, an airborne radio maintains challenges in connecting to the plurality of towers of the ground-based wireless network. The airborne radio maintains line of sight connectivity potential to a plurality of connection nodes (towers) of the ground based wireless network. Maintaining a connection to one tower may be impossible since the air vehicle upon which the airborne radio may be mounted may be free from physical obstructions found when using a ground-based radio. Additionally, the speed with which the aircraft may travel may require a roaming capability between not only additional towers of the wireless network but also separate carriers owning and managing the towers of the wireless network.

While it may be technically possible to operate an air-to-ground link with this issue, even a small amount of interference may exceed the tolerance of current ground network managers and users. Any increase in interference may be unacceptable, resulting in an inability to make calls, lost calls, and lower data rates for the ground-based users. This antenna beam geometry challenge (beam size and pointing sensitivity) may not be practically controllable at greater ranges. Short-range beam pointing may help limit the number of towers "visible" to the airborne antenna. However longer ranges required in areas with greater spacing between towers (i.e. in mountainous and less populated areas where towers may be more than 100 miles apart), may cause significant problems. At 10,000 feet altitude, with a near horizontal antenna look angle, airborne antenna with a fixed lateral beam width at a range of 130 miles may exceed 40 miles in width. This beam width may force unwanted uplink visibility to dozens of towers spaced at 6 to 12 miles apart within a 2-D beam projection. Each additional tower within radio range may be subject to this interference and further amplify the problem.

During a transmission from an airborne source, this unwanted uplink visibility in the same RF frequency band may reduce network capacity to other airborne and ground-based users operating in the same frequency band in the vicinity. Antenna coverage angle may be one of many causes of interference to ground-based wireless networks.

During connectivity with a wireless network, proximal frequency use by another with increased power or increased transmission coverage may cause interference. A user in the same frequency band may interfere with connectivity. Wireless providers may operate in resource blocks or chunks of spectrum. Operation within these blocks of spectrum may preclude deconfliction among separate users Various options have been considered to minimize interference between an airborne radio and a ground radio. One option may include specially equipped air communication tower locations (i.e. 100 mile spacing). This distance based option may provide each such equipped tower with an ability for split service (air/ground) for improved signal to noise (S/N) and connectivity to the aircraft. However, interference/desensitization issues to the ground users would still be a problem since the airborne radio may continue to transmit over non-equipped towers. Without a limitation on transmit directivity, many dozens of towers on the ground may receive an interfering wireless signal.

Therefore, a novel approach may be necessary to positively deconflict signal transmissions between an airborne user of a ground-based wireless network and a ground user of the ground-based wireless network. Through accurate and dynamic allocation of time slices of ground-based cellular bandwidth for use by an airborne user, and through downlink power control and frequency separation between air and ground uplinks, airborne users may achieve effective connectivity with a ground-based cellular network free from interference to connected ground users.

SUMMARY OF THE INVENTION

Accordingly, a preferred embodiment of the present invention is directed to a method for method for radio frequency (RF) communication deconfliction between a ground-based radio and an airborne radio wireless communicating with a ground-based cellular network, comprising: configuring a ground-based connection node of the ground-based cellular network to communicate, via a plurality of RF signals within a frequency band, with the ground-based radio and with the airborne radio. The method may configure the connection node by segmenting the frequency band into a plurality of time/frequency segments, dividing the frequency band into a ground group of segments and an air group of segments via a frequency barrier, the frequency barrier being associated with a first frequency from the frequency band, changing the frequency barrier to a second frequency from the frequency band based on an analysis of a current state of connectivity to the ground-based connection node. The method then may schedule a first allocation of the plurality of time/frequency segments for a first ground-based radio from within the ground group of segments, schedule a second allocation of the plurality of time/frequency segments for a second ground-based radio from within the ground group of segments, schedule a third allocation of the plurality of time/frequency segments for a first airborne radio from within the air group of segments, schedule a fourth allocation of the plurality of time/frequency segments for a second airborne radio from within the air group of segments. The method finally may communicate with the first ground-based radio, the second ground-based radio, the first airborne radio, and the second airborne radio based on the scheduling.

A further embodiment of the present invention is directed to a method for radio frequency (RF) communication deconfliction between a ground-based radio and an airborne radio. The steps of the method comprise: communicating with a ground-based cellular network by: communicating with the ground-based radio via: sending a first wireless signal to the ground-based radio via a first frequency, the first frequency being within a first frequency band, receiving a second wireless signal from the ground-based radio via a second frequency, the second frequency being within the first frequency band. The method may communicate with the airborne radio via a split band, comprising: configuring a proxy server at a ground-based connection node to facilitate communicating between the airborne radio and the ground-based cellular network, sending a third wireless signal to the airborne radio via a third frequency, the third frequency being within the first frequency band, configuring an airborne proxy server associated with the airborne radio to facilitate the communicating between the airborne radio and the ground-based connection node, receiving a fourth wireless signal from the airborne radio via a fourth frequency, the fourth frequency being within a second frequency band.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which:

FIG. 6 is a flowchart of a preferred embodiment of a method of operation of the invention shown in FIG. 4.

DETAILED DESCRIPTION OF THE INVENTION

The present application is related to, and incorporates herein by reference, U.S. patent application Ser. No. 13/539,638 filed 2 Jul. 2012, by James P. Mitchell, entitled "Terrestrial Communications Network Suitable for providing Air-to-Ground Connectivity." Using a network of existing cellular towers for airborne communication may present a cost effective alternative to other connectivity options. However, limitations remain concerning interference among adjacent towers in the path of the uplink from the aircraft to the tower.

Another option for interference reduction may include accurate pointing of the aircraft antenna and power control of the aircraft transceiver to minimize interference between the desired tower and adjacent towers. The present invention is also related to, and incorporates herein by reference, U.S. patent application Ser. No. 13/493,047 filed 11 Jun. 2012, entitled "Air-To-Ground Antenna Pointing Using Kalman Optimization of Beam Control Systems." An ability to accurately control direction of antenna transmission may alleviate a portion of the interference problem. However, due to limitations on beam width and geometry restrictions on antenna size, this method may not completely limit undesirable interference.

Reference will now be made in detail to the presently preferred embodiments of the invention, examples of which are illustrated in the accompanying drawings.

The following description presents certain specific embodiments of the present invention. However, the present invention may be embodied in a multitude of different ways as defined and covered by the claims. In this description, reference is made to the drawings wherein like parts are designated with like numerals throughout.

Embodiments of the present invention address the use of cellular towers for interference free air-to-ground connectivity to a wireless network. The methods and systems of the present invention may maintain a unique ability to coexist with and reuse existing wireless infrastructure without interference to existing ground-based wireless customers.

Should an airborne radio be configured connect to an existing wireless network in accordance with an embodiment of the present invention, positive deconfliction (i.e. zero interference) between the airborne radio and a ground-based radio connected to the network may be one goal of the present invention. This goal may be one of the only methods by which owners and managers of existing ground based wireless networks may allow airborne radios to connect to their managed wireless networks.

Figure 1:
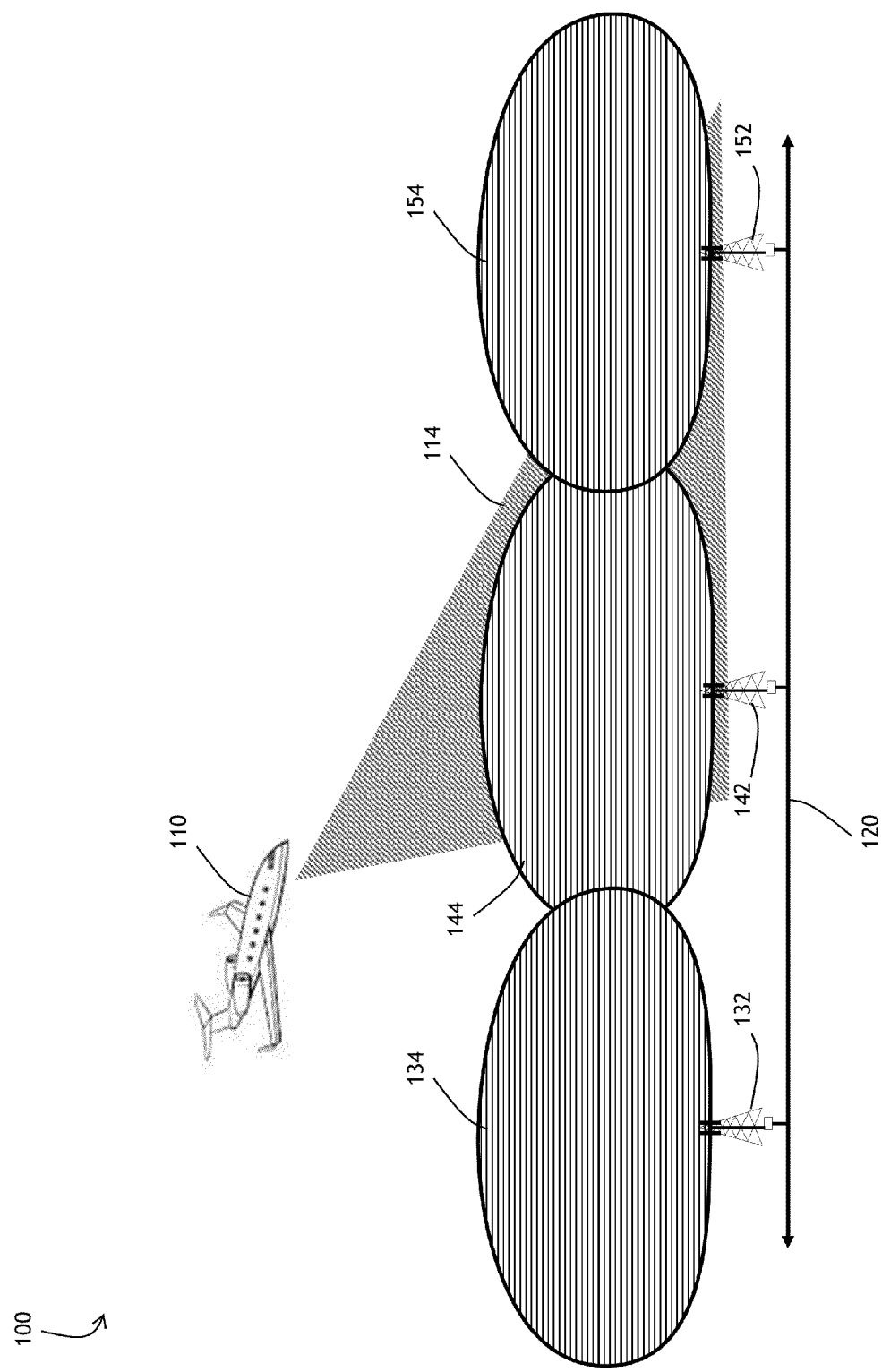
FIG. 1 is an overview of airborne radio transmission coverage in accordance with a preferred embodiment of the present invention.

Referring to FIG. 1, an overview of airborne radio transmission coverage in accordance with a preferred embodiment of the present invention is shown. The airborne radio 110 may transmit in a wide transmission pattern 114 during an uplink from airborne radio 110 to a ground-based connection node 142. Target ground-based connection node 142 and associated transmission pattern thereof 144 may receive the uplink transmission, however adjacent ground-based connection node 152 and associated transmission pattern 154 may also receive the transmission as it lies within the radio transmission coverage 114 of airborne radio 110.

The airborne radio 110 may possess a degree of directional capability to command a specific direction or azimuth shape of transmission. Adjacent ground-based connection node 132 and associated transmission pattern 134 may lie outside the transmission pattern 114 of airborne radio 110 thus receiving no RF energy from airborne radio 110. For example, should airborne radio 110 possess the ability to transmit directionally, it may be able to limit the number of ground-based connection nodes covered by the transmission pattern 114. Furthermore directionality may include ability to control RF power level as described in above referenced application Ser. No. 13/493,047.

Traditionally, ground-based connection nodes or towers as used herein may be spaced a number of miles apart to maximize ground-based connectivity yet minimize required towers. A nominal spacing of 6-12 miles between towers may be found in more populous areas while longer spacing of 50-75 miles may occur. The more frequent the tower spacing, the greater threat to interference from the airborne radio 110 transmissions.

Each of the ground-based connection nodes 132, 142, 152 may operably connect to the ground-based cellular network 120 for further network and internet connectivity options.

Figure 2:
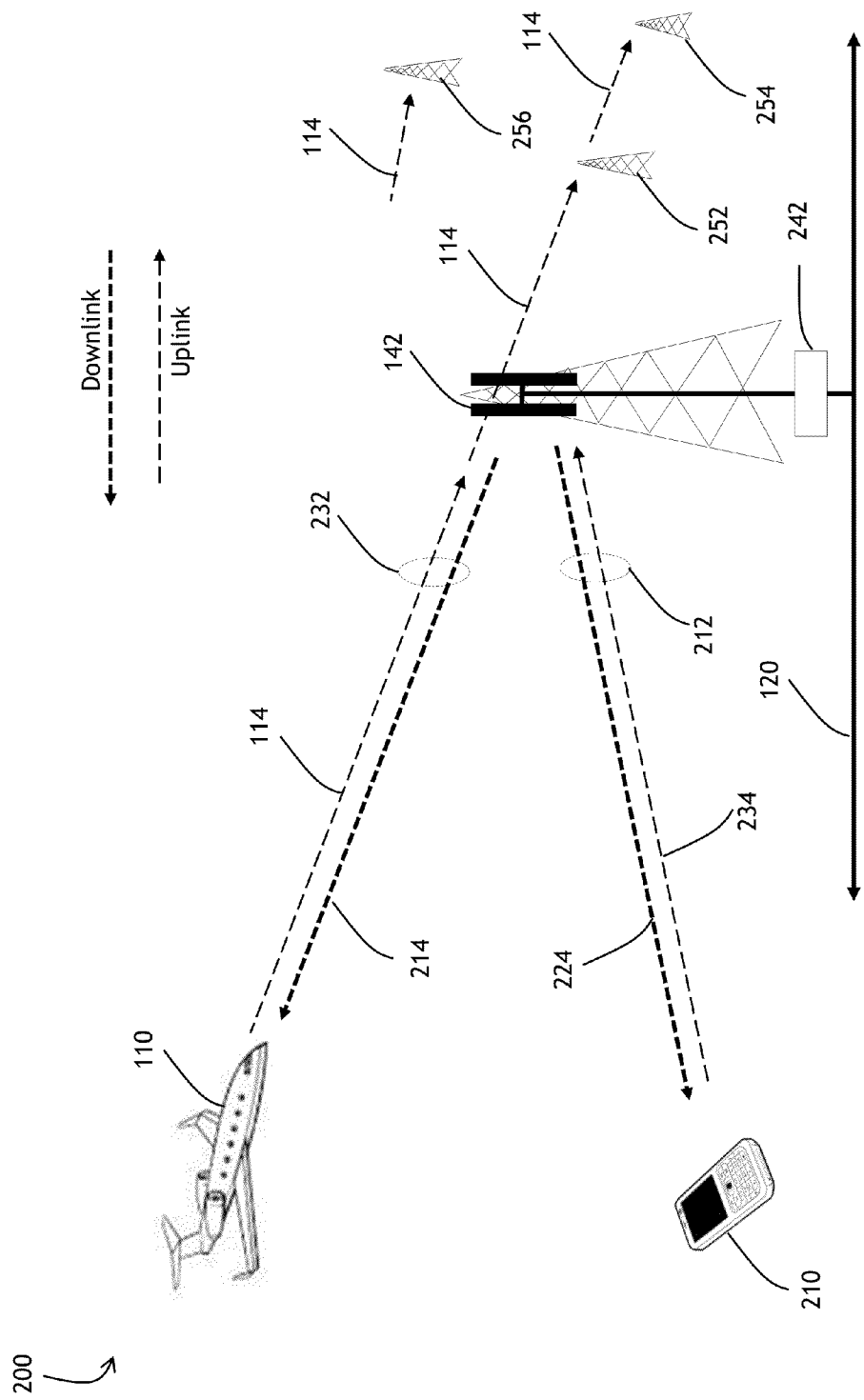
FIG. 2 is a diagram of uplink and downlink transmissions illustrative of a preferred embodiment of the present invention.

Referring to FIG. 2, a diagram of uplink and downlink transmissions illustrative of a preferred embodiment of the present invention is shown. Airborne radio 110 may transmit an uplink 114 to the ground-based connection node 142 and receive a downlink 214 from the ground-based connection node 142 forming an airborne wireless connectivity 232. Similarly, ground-based radio 210 may transmit an uplink 224 to the ground-based connection node 142 and receive a downlink 224 from the ground-based connection node 142 forming a ground-based wireless connectivity 212. Of note, both ground-based radio 210 and airborne radio 110 may use the same ground-based connection node 142 for connectivity to the ground-based cellular network 120 via processor 242.

Uplink 114 from airborne radio 110 may be omnidirectional and, even if uplink may be partially directional, uplink 114 may be received by adjacent towers 252, 254, and 256. Without the deconfliction methods of the present invention, this over transmission of uplink 114 may cause interference with additional users desiring connectivity to any of the ground-based connection nodes 142, 252, 254, 256.

Figure 3:
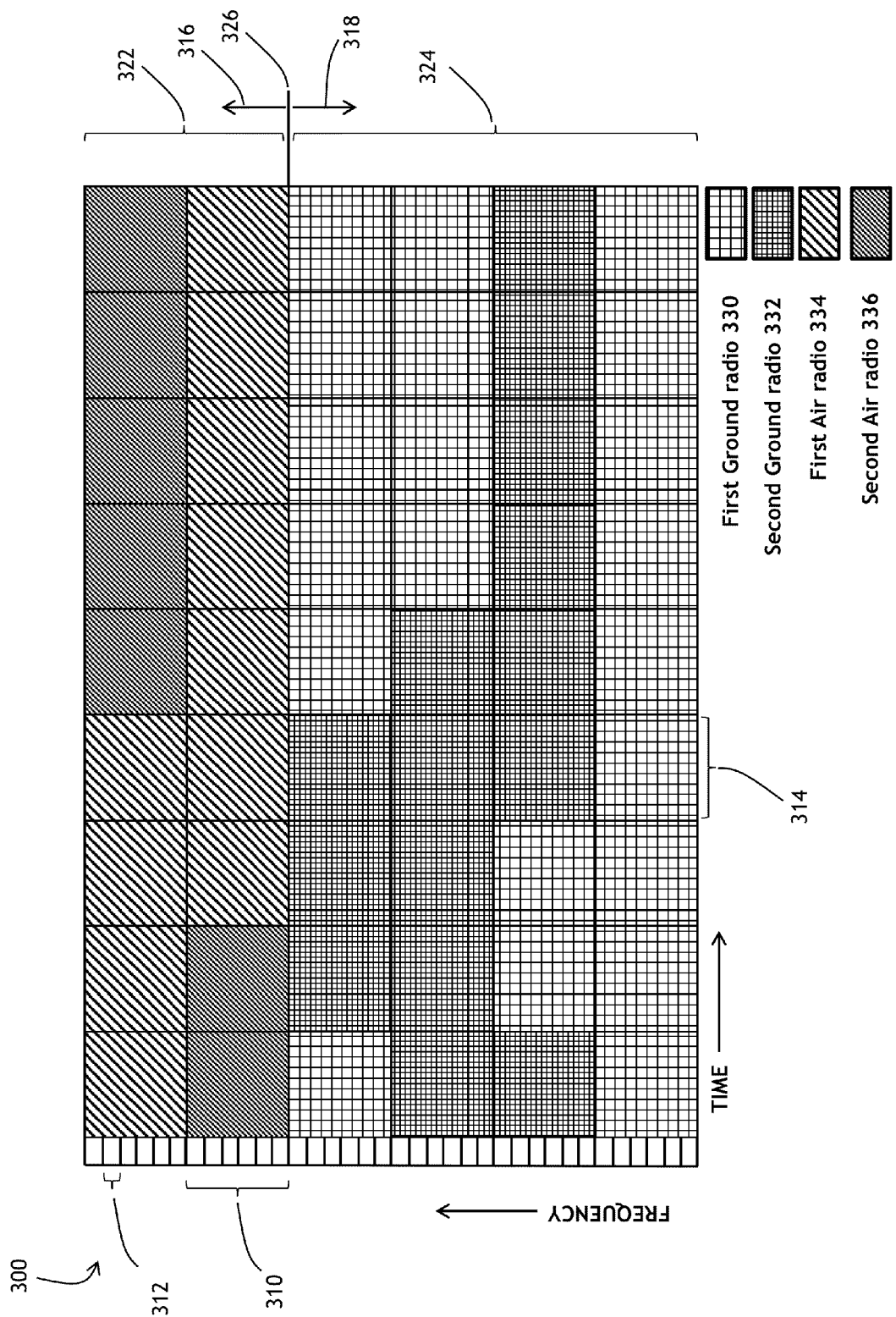
FIG. 3 is a block diagram of a method of time frequency division in accordance with a preferred embodiment of the present invention.

Referring to FIG. 3, a block diagram of a method of time frequency division in accordance with a preferred embodiment of the present invention is shown. Method 300 may comprise a novel division of plurality of time/frequency segments of spectrum, one division allocated for a ground-based radio and a second division allocated for an airborne radio. One primary goal of this preferred embodiment may include reduction and likely elimination of interference between collocated air and ground radios.

A plurality of time/frequency segments as used herein may be defined as an available resource block of spectrum during a specific period of time. For example, one baseline time/frequency segment as used herein may be defined as a frequency segment 310 of 180 kHz by a time segment 314 of 1 millisecond (ms).

Recently developed network connectivity schemes may use a mosaic of spectrum and time resource blocks for each symbol sent. Given this unique transmit/receive process, processors integrated within ground-based connection node (eNodeB) towers may dynamically set aside blocks for each user (e.g., building and tearing down for each connectivity session).

Method 300 may be preferably indicated by the plurality of divisions of time and spectrum in FIG. 3. The horizontal axis may be represented by time from left to right while the vertical axis may represent increasing frequency. Each of the divisions 312 of frequency on the vertical axes may preferably correspond to a 30 kHz channel 312 as known by those of skill in the art of time division multiplexing and orthogonal frequency division multiplexing (OFDM). Although FIG. 3 may represent an example baseline segment of 180 kHz by 1 ms, it is contemplated herein that lesser and greater divisions of time and spectrum may be operational within the scope of the present invention.

The plurality of time/frequency segments may be dynamically divided by processor 242 into a ground group of segments 324 and an air group of segments 322. Such dynamic division may be indicated by a frequency barrier 326. Frequency barrier 326 may be dynamically periodically positioned based on a current state of usage of the available bandwidth. For example, given an exemplary downlink frequency band of 746-757 MHz, a baseline frequency barrier 326 may be placed at 753 MHz. This dynamic allocation of spectrum from 746 to 753 MHz may be temporarily allocated and maintained through a unique air-to-ground protocol in the form of a spectrum lock-out to ground based radios while the remaining spectrum from 753 to 757 MHz may be allocated to airborne radios.

Within the spectrum division there may also be a time based allocation of the plurality of time/frequency segments. For example, each 1 ms, a current state of connectivity may be analyzed to dynamically divide the ground group of segments 324 from the air group of segments 322. Should more ground-based users desire connectivity, method 300 may place the frequency barrier at a position allowing more of the plurality of time/frequency segments available to ground-based radios as indicated by movement arrow 316. Should more airborne radios desire connectivity, method 300 may move frequency barrier 326 in the opposite direction of movement arrow 318 to dynamically allocate more plurality of time/frequency segments available to airborne radios.

Additionally, a preference may be allotted to one group of users of the ground-based connection node over another. For example, should the manager of the ground-based cellular network desire ground based users connection priority over airborne users, a preference measure may be added to the positioning decisions of the frequency barrier. An exemplary preference may be based on roaming status, range, customer status level, and the like.

Used herein, the frequency barrier may not be limited to a single frequency. The barrier may be required that a range of frequencies or buffer be in place to minimize interference. For example, frequency barrier 326 may be 90 kHz in width, creating a buffer between the ground group of segments 324 and the air group of segments 322 thereby further reducing potential interference.

Method 300 may preferably allocate to a first ground-based radio 330 a specific pattern of segments of available time/spectrum. For the current time segment, the allocated frequency/time blocks belong to the first ground-based radio 330. During the next time segment, method 300 may allocate the frequency to a second radio. For exemplary purposes, two ground based radios 330 and 332 are shown while two airborne radios 334, 336 are shown. It is contemplated method 300 may continuously control frequency allocations to an unlimited number of airborne radios and ground-based radios.

Method 300 may select RF base station spectrum resources such that they produce orthogonal spectrum resources available to allocate to a specific radio. Method 300 may provide these exclusive segments of time/spectrum as long as there is air and ground traffic.

Figure 4:
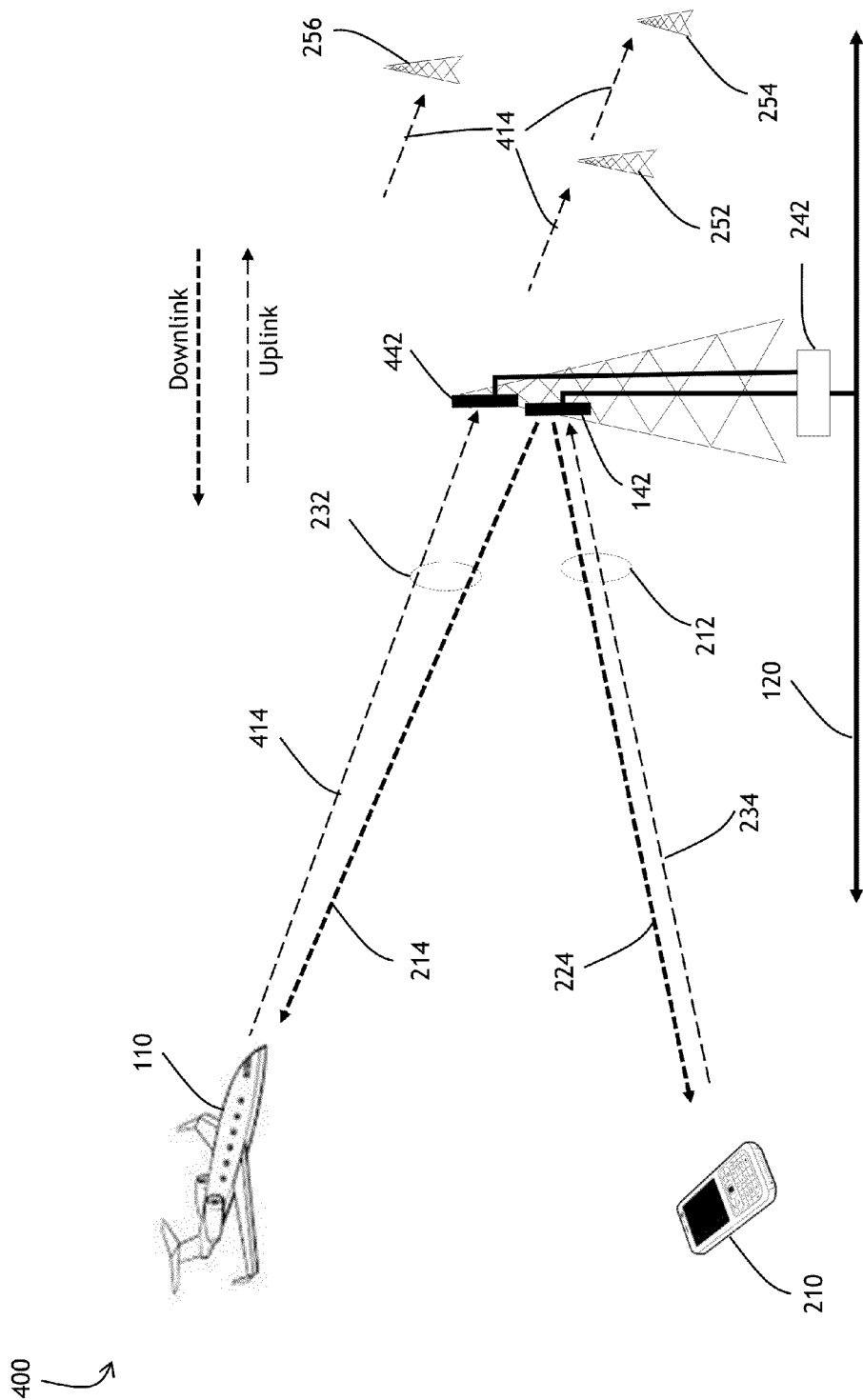
FIG. 4 is a diagram of deconflicted uplink and downlink transmissions illustrative of a preferred embodiment of the present invention.

Referring to FIG. 4, a diagram of deconflicted uplink and downlink transmissions illustrative of a preferred embodiment of the present invention is shown. In order to achieve one goal of the present invention of elimination of uplink interference, method 400 may require a modification to the ground-based connection node to include an additional reception capability of a second frequency band. This second band capability may be illustrated by a second ground-based connection node 442 in addition to the first ground-based connection node 142. As used herein, a frequency band may be defined as a contiguous range of frequencies historically used for a common purpose.

The ground-based radio 210 may uplink 224 and downlink 234 with the first node 142 as discussed above, while the airborne radio 110 may preferably receive the downlink 214 from the first ground-based connection node. The airborne radio 110 may uplink 414 via the second frequency band to the ground-based cellular network 120 through ground-based connection node 442 and processor 242. Further, processor 242 may comprise a well-known split proxy server able to segment and fuse data for further transmission to the network. Similarly, a split proxy server may be required within airborne radio 110 to split and fuse data for effective data connectivity.

With no tower modification of the present invention and an airborne radio transmitting an uplink 414 on the same frequency as a ground-based radio uplink 224, uplink 414 from the airborne radio may be received by adjacent towers 252, 254, and 256. This interference may result in a temporary pull back or shut down of the uplink frequency on those adjacent towers. Should adjacent towers 252, 254, and 256 remain unmodified with the second band reception capability, interference with ground-based connectivity to the adjacent towers may not occur.

Method 400 may remove unwanted uplink (UL) interference while retaining the cellular service provider's backhaul network and down link (DL) spectrum and capacity. The down link 214, 224 may be the most valuable spectrum as it may require a greater amount of data transfer capability and may cover a greater amount of frequency band region. The price for this innovation may be the "relocation" of the airborne radio's narrow band uplink 414 spectrum to the second band. This may be much more easily done than relocating the entire aircraft connectivity 232 to the second band.

Additionally, it is contemplated the current invention may provide for split tower operations for uplink 414 and downlink 214. An airborne radio 110 may maintain the ability to uplink 414 to a first tower modified by method 400, while maintaining the ability to downlink from a second tower unmodified or modified by method 400 and vice versa. For example, airborne radio 110 may receive a downlink 214 from a ground-based connection node on tower 252 while transmitting an uplink to ground-based connection node 442. The split proxy servers within each of the ground-based system and the airborne system may allow for effective split tower and split proxy connectivity.

One goal of the present invention may be independence from a specific modulation scheme. Contemplated modulation techniques herein may include a lower order constellation of 16 Quadrature amplitude modulation (QAM) as well as a higher order, conceivably 64-QAM and greater. Conceivable applications of 1024-QAM and 4096-QAM modulation may enable operational data transfer between radios and falls within the scope of the present invention.

One additional goal of the present invention may include power modulation techniques for efficient communication with the airborne radio. Freedom from a specific power modulation technique may allow effective connectivity within the scope of the present invention. A variable ground antenna power output based on the sensitivity of the airborne radio may enable effective and efficient air-to-ground communication. Equivalent isotropically radiated power (EIRP) values of sufficient measure to effectively transmit downlink 214 to airborne radio 110 may enhance connectivity while reducing interference.

One additional goal of the present invention may include directional power modulation aligned with a planned track of airborne radio on board a user's aircraft. For example, in locations where airborne traffic may traverse from east to west and vice versa, there may be little reason to align maximum power output in a north south direction. A ground-based connection node with an antenna aligned with maximum power output to the east and west may better accommodate a user aircraft travelling in an east and west direction.

One additional goal of the present invention may include freedom from a specific frequency band. Currently used cellular frequency bands may provide effective communication between a ground-based radio and a ground-based connection node. Frequency bands of higher frequency and of lower frequency than currently used cellular bands fall within the scope of the present invention. While the second band used to deconflict airborne radio 110 uplink 414 may be unequal to the first band used for the downlink 214, it is contemplated there are no restrictions to the preferred frequency of the second band. For example, the second band may be from a frequency band previously licensed and used as a broadcast band. Additionally, a frequency band leased from a third party may prove beneficial to enabling deconfliction between the frequencies used by the airborne radio and the ground-based radio.

Additionally, paired frequency bands and unpaired frequency bands may provide a useful alternative for the uplink from airborne radio to the tower. As used herein an unpaired band may include a band that has no transmit or receive pair. Also, use of broadcast channels may enable deconfliction within the scope of the present invention.

In addition, each of the four RF links: 1) ground uplink 2) ground downlink 3) air uplink, and 4) air downlink may exist in its own separate frequency band within the scope of the instant invention. For example, complete separation from each of the links may provide enhanced deconfliction:

| | |
|---|---|
| Ground uplink | 54-72 MHz |
| Ground downlink | 698-746 MHz |
| Air uplink | 88-108 MHz |
| Air downlink | 794-806 MHz |

Again, frequency independence is one goal of the instant invention. Use of additional spectrum unlimited by frequency may enable positive deconfliction within the scope of the present invention.

Additionally, the second band may be from within the same frequency allocation to a provider as the first frequency band. For example, a certain provider may be allocated a frequency band by a governmental entity such as the U.S. Department of Commerce. Such frequency allocation may be found in a publication distributed by such governmental entity. For example, in the U.S. the U.S. Department of Commerce may distribute a Frequency Allocation Table found at http://www.ntia.doc.gov/files/ntia/publications/2003-allochrt.pdf which is incorporated herein by reference in its entirety. Within such frequency allocation table, additional governmental agencies may further allocate frequencies to a specific provider. For example, in the U.S., the Federal Communications Commission (FCC) may allocate a frequency band from 698 MHz to 746 MHz to a specific provider. In the instant invention, should method 400 require the uplink 414 be in a distant frequency band (i.e. 54-72 MHz), method 400 may use a split frequency scheme to deconflict the airborne radio uplink 414 from 1) the ground-based radio uplink, 2) the ground-based radio downlink, and 3) the airborne radio downlink. Conversely, should method 400 require all uplinks and downlinks to be from within the same frequency band (698-746 MHz in the present example), method 400 may use one-half duplex methodology to deconflict each of the signals from the other.

This one-half duplex deconfliction may be an additional goal of the present invention. One half duplex connectivity between an airborne radio in RF connectivity with a ground-based connection node and a ground-based radio in RF connectivity with the ground-based connection node may provide interference free connectivity between the two radios. Half duplex operation may be well-known to those of ordinary skill, however, such use of one half duplex operation between an airborne radio and the ground-based connection node connecting within the same frequency band as a ground-based radio may connect with the node, may solve one problem concerning interference between the radios in connection with the same node.

Figure 5:
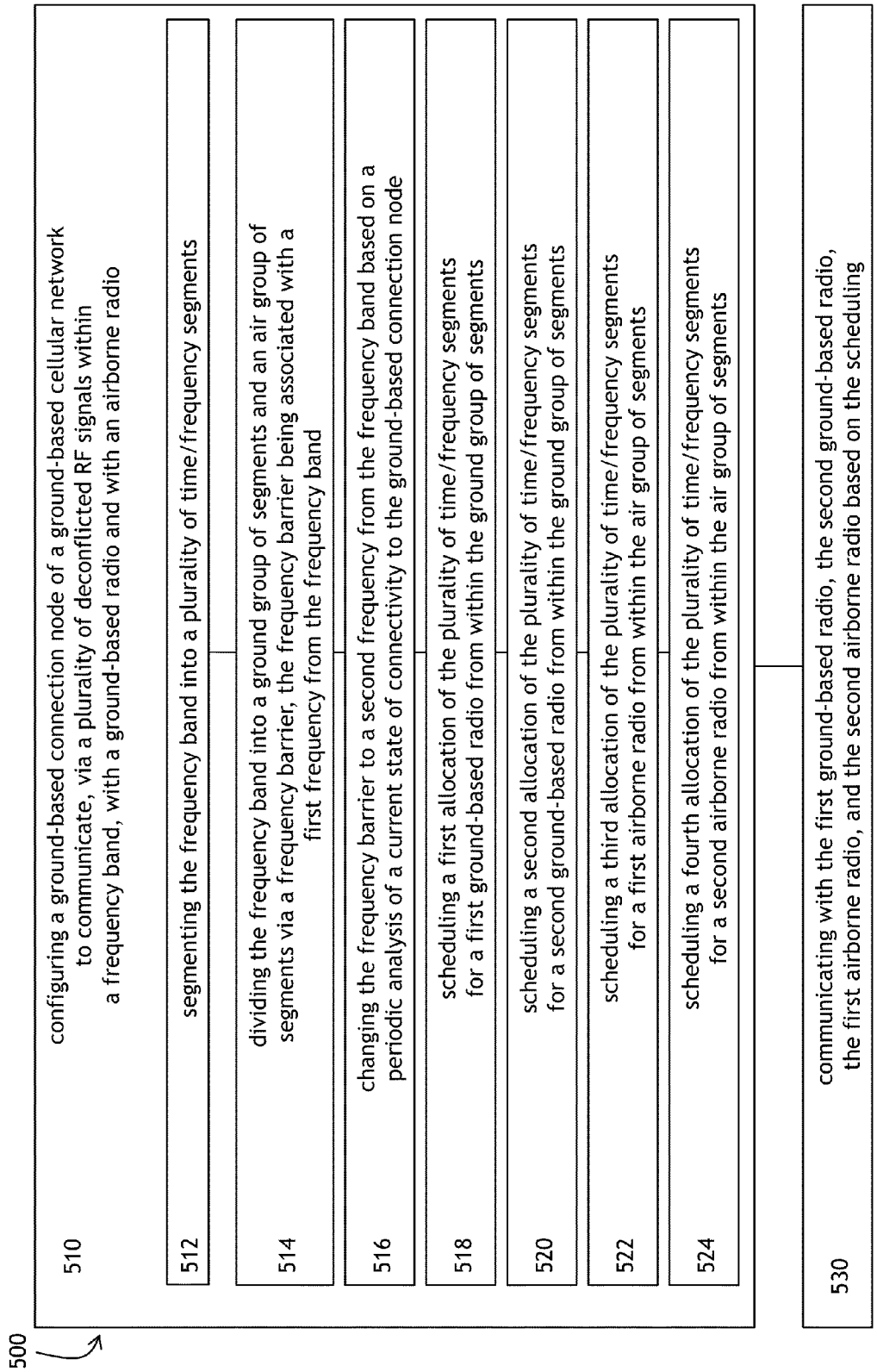
FIG. 5 is a flowchart of a preferred embodiment of a method of operation of the invention shown in FIG. 3.

Referring to FIG. 5, a flowchart of a preferred embodiment of a method of operation of the invention shown in FIG. 3 is shown. Method 500 may enable radio frequency (RF) communication deconfliction between a ground-based radio and an airborne radio wirelessly communicating with a ground-based cellular network. Method 500 may comprise, at step 510, configuring a ground-based connection node of the ground-based cellular network to communicate, via a plurality of RF signals within a frequency band, with the ground-based radio and with the airborne radio, the configuring comprising at step 512, segmenting the frequency band into a plurality of time/frequency segments.

Method 500 may continue, at step 514, with dividing the frequency band into a ground group of segments and an air group of segments via a frequency barrier, the frequency barrier being associated with a first frequency from the frequency band. At step 516, method 500 may change the frequency barrier to a second frequency from the frequency band based on a periodic analysis of a current state of connectivity to the ground-based connection node, at step 518, scheduling a first allocation of the plurality of time/frequency segments for a first ground-based radio from within the ground group of segments, at step 520, scheduling a second allocation of the plurality of time/frequency segments for a second ground-based radio from within the ground group of segments, at step 522, scheduling a third allocation of the plurality of time/frequency segments for a first airborne radio from within the air group of segments, and at step 524, scheduling a fourth allocation of the plurality of time/frequency segments for a second airborne radio from within the air group of segments. Method 500 may continue, at step 530, with communicating with the first ground-based radio, the second ground-based radio, the first airborne radio, and the second airborne radio based on the scheduling.

Referring to FIG. 6, a flowchart of a preferred embodiment of a method of operation of the invention shown in FIG. 4 is shown. Method 600 may comprise a method for radio frequency (RF) communication deconfliction between a ground-based radio and an airborne radio communicating with a ground-based cellular network. Method 600 may comprise, at step 610, communicating with the ground-based radio via, at step 612, sending a first wireless signal to the ground-based radio via a first frequency, the first frequency being within a first frequency band, and, at step 614, receiving a second wireless signal from the ground-based radio via a second frequency, the second frequency being within the first frequency band.

Method 600 may comprise, at step 620, deconflicting an airborne radio communication from the ground-based radio communication via a split band, comprising, at step 622, configuring a proxy server at a ground-based connection node to facilitate communicating between the airborne radio and the ground-based cellular network, at step 624, sending a third wireless signal to the airborne radio via a third frequency, the third frequency being within the first frequency band, at step 626, configuring an airborne proxy server associated with the airborne radio to facilitate the communicating between the airborne radio and the ground-based connection node, and, at step 628, method 600 may receive a fourth wireless signal from the airborne radio via a fourth frequency, the fourth frequency being within a second frequency band.

Conclusion

Specific blocks, sections, devices, functions, processes and modules may have been set forth. However, a skilled technologist will realize that there are many ways to partition the system, and that there are many parts, components, processes, modules or functions that may be substituted for those listed above While the above detailed description has shown, described and pointed out the fundamental novel features of the invention as applied to various embodiments, it will be understood that various omissions and substitutions and changes in the form and details of the method and system illustrated may be made by those skilled in the art, without departing from the intent of the invention. The foregoing description details certain embodiments of the invention. It will be appreciated, however, that no matter how detailed the foregoing appears, the invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed is:

1. A method for radio frequency (RF) communication deconfliction between a ground-based radio and an airborne radio wirelessly communicating with a ground-based cellular network, comprising:
    configuring a ground-based connection node of said ground-based cellular network to communicate, via a plurality of RF signals within a frequency band, with said ground-based radio and with said airborne radio, said configuring comprising:
    segmenting said frequency band into a plurality of time/frequency segments;
    dividing said frequency band into a ground group of segments and an air group of segments via a frequency barrier, said frequency barrier being associated with a first frequency from said frequency band;
    changing said frequency barrier to a second frequency from said frequency band based on a periodic analysis of a current state of connectivity to said ground-based connection node;
    scheduling a first allocation of said plurality of time/frequency segments for a first ground-based radio, said first allocation from within said ground group of segments;
    scheduling a second allocation of said plurality of time/frequency segments for a second ground-based radio, said second allocation from within said ground group of segments;
    scheduling a third allocation of said plurality of time/frequency segments for a first airborne radio, said third allocation from within said air group of segments;
    scheduling a fourth allocation of said plurality of time/frequency segments for a second airborne radio, said fourth allocation from within said air group of segments; and
    communicating with said first ground-based radio, said second ground-based radio, said first airborne radio, and said second airborne radio based on said scheduling.

2. The method of claim 1, wherein said ground-based connection node further comprises a cellular tower configured for air-to-ground and ground-to-ground communications, said cellular tower maintaining a variable transmission power output, said variable transmission power output controllable to correspond with meeting a modulation sensitivity threshold of said airborne radio.

3. The method of claim 1, wherein said ground-based connection node further comprises a Node B (eNodeB) cellular connection node.

4. The method of claim 1, wherein said current state of connectivity further comprises at least one of: a number of connected ground-based radios, a number of connected airborne radios, a bandwidth availability, and a measurement of RF connectivity quality.

5. The method of claim 1, wherein changing said frequency barrier to a second frequency from within said frequency band further comprises a change based on a periodic analysis of a current usage of a current amount of available time segments of spectrum.

6. A method for radio frequency (RF) communication deconfliction between a ground-based radio and an airborne radio, communicating with a ground-based cellular network, comprising:
    communicating with said ground-based radio via:
        sending a first wireless signal to said ground-based radio via a first frequency, said first frequency being within a first frequency band;
        receiving a second wireless signal from said ground-based radio via a second frequency, said second frequency being within said first frequency band;
    communicating with said airborne radio via a split band, comprising:
        configuring a proxy server at a ground-based connection node to facilitate communicating between said airborne radio and said ground-based cellular network;
        sending a third wireless signal to said airborne radio via a third frequency, said third frequency being within said first frequency band;
        configuring an airborne proxy server associated with said airborne radio to facilitate said communicating between said airborne radio and said ground-based connection node;
        receiving a fourth wireless signal from said airborne radio via a fourth frequency, said fourth frequency being within a second frequency band.

7. The method of claim 6, wherein said first frequency band further comprises one of: a paired cellular frequency band, an unpaired cellular frequency band, and is separated from said second frequency band.

8. The method of claim 6, wherein said second frequency band further comprises one of: an unpaired cellular frequency band, a paired cellular frequency band, a frequency band configured for one-half duplex within said first frequency band, a frequency band equal to said first frequency band, a broadcast band, a leased frequency band, and a frequency band from 698 MHz to 40 GHz.

9. The method of claim 6, wherein configuring a proxy server at a ground-based connection node further comprises a split proxy server configured for data fragmentation and data reconstruction via separate send and receive IP addresses.

10. The method of claim 6, wherein said first frequency band and said second frequency band are from within a single frequency band and further configured for one-half duplex communication.

11. The method of claim 6, wherein said first wireless signal, said second wireless signal, said third wireless signal, and said fourth wireless signal are further configured for one-half duplex communication.

12. The method of claim 6, wherein said first frequency band and said second frequency band are from within a single frequency band and further configured for one-half duplex communication.

13. The method of claim 6, wherein configuring an airborne proxy server associated with said airborne radio further comprises an airborne split proxy server configured for separate channel data fragmentation and data reconstruction.

14. The method of claim 6, wherein said third wireless signal is transmitted in said second frequency band and said fourth wireless signal is transmitted in a third frequency band.

15. A computer readable medium storing non-transitory computer readable program code embodied therein for directing radio frequency (RF) communication deconfliction between a ground-based user and an airborne user of a ground-based cellular network, the non-transitory computer readable program code comprising instructions which, when executed by a processor, or state machine, perform the steps of:
    segmenting a frequency band into a plurality of time/frequency segments;
    dividing said frequency band into a ground group of segments and an air group of segments via a frequency barrier, said frequency barrier being associated with a first frequency from said frequency band;
    changing said frequency barrier to a second frequency from within said frequency band based on a periodic analysis of a current state of network loading and connectivity to said ground-based connection node;
    scheduling a first allocation of said plurality of time/frequency segments for a first ground-based radio from within said ground group of segments;
    scheduling a second allocation of said plurality of time/frequency segments for a second ground-based radio from within said ground group of segments;
    scheduling a third allocation of said plurality of time/frequency segments for a first airborne radio from within said air group of segments;
    scheduling a fourth allocation of said plurality of time/frequency segments for a second airborne radio from within said air group of segments;
    directing a base radio to communicate with said ground-based radio and said airborne radio based on said scheduling, said base radio integrated within a ground-based connection node operably coupled to said ground-based cellular network.

16. The system of claim 15, wherein said ground-based connection node further comprises a cellular tower configured for air-to-ground and ground-to-ground communications, said cellular tower maintaining a variable transmission power output, said variable transmission power output variable to correspond with meeting a modulation sensitivity threshold of said airborne radio.

17. The system of claim 15, wherein said ground-based connection node further comprises a Node B (eNodeB) cellular connection node.

18. The system of claim 15, wherein said current state of connectivity further comprises at least one of: a number of connected ground-based radios, a number of connected airborne radios, a bandwidth availability, and a measurement of RF connectivity quality.

19. The system of claim 15, wherein changing said frequency barrier to a second frequency from within said frequency band further comprises a real time allocation based on a periodic analysis of a current usage of a current amount of available time segments of spectrum.

20. A computer readable medium storing non-transitory computer readable program code embodied therein for radio frequency (RF) communication deconfliction between a ground-based user and an airborne user of a ground-based cellular network, the non-transitory computer readable code comprising instructions which, when executed by a processor or state machine, perform the steps of:
    directing a base radio to communicate with said ground-based radio, said base radio integrated within a ground-based connection node operably coupled to said ground-based cellular network, comprising:
        sending a first wireless signal to said ground-based user via a first frequency, said first frequency being within a first frequency band; and
        receiving a second wireless signal from said ground-based radio via a second frequency, said second frequency being within said first frequency band;
    commanding a proxy server within said ground-based connection node to facilitate said communication between said airborne radio and said ground-based cellular network;
    directing said base radio to communicate with said airborne radio via a split band, comprising:
        sending a third wireless signal to said airborne user via a third frequency, said third frequency being within said first frequency band; and
        receiving a fourth wireless signal from said airborne radio via a fourth frequency, said fourth wireless signal configured by an airborne proxy server associated with said airborne radio to facilitate said communication between said airborne radio and said ground-based connection node, said fourth frequency being within a second frequency band.

21. The system of claim 20 wherein said wherein said first frequency band is separated from said second frequency band by a guard band of at least 50 MHz 22. The system of claim 20 wherein said second frequency band further comprises a frequency band from 698 MHz to 40 GHz.

23. The system of claim 20 wherein commanding a proxy server within said ground-based connection node to facilitate said communication between said airborne radio and said ground-based cellular network further comprises employing a split proxy server configured for at least one of: split IP operation, data fragmentation, and data reconstruction.

24. The system of claim 20 wherein receiving a fourth wireless signal from said airborne radio via a fourth frequency further comprises a base radio receiver configured to receive a signal processed by an airborne split proxy server associated with said airborne radio and configured for at least one of: split IP operation, data compression, data fragmentation, and data reconstruction.

* * * * *